(12) United States Patent
Nordbruch

(10) Patent No.: US 10,532,771 B2
(45) Date of Patent: Jan. 14, 2020

(54) METHOD AND APPARATUS FOR LOCALIZING A MOTOR VEHICLE

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 434 days.

(21) Appl. No.: 15/412,664

(22) Filed: Jan. 23, 2017

(65) Prior Publication Data

US 2017/0212510 A1 Jul. 27, 2017

(30) Foreign Application Priority Data

Jan. 21, 2016 (DE) .......................... 10 2016 200 794

(51) Int. Cl.
*B62D 15/00* (2006.01)
*B62D 15/02* (2006.01)

(52) U.S. Cl.
CPC ................ *B62D 15/0285* (2013.01)

(58) Field of Classification Search
USPC ............................................. 701/2
See application file for complete search history.

(56) References Cited

U.S. PATENT DOCUMENTS

| 6,407,698 | B1 | 6/2002 | Ayed | |
|---|---|---|---|---|
| 9,508,260 | B2 * | 11/2016 | Shaik | ........................ G08G 1/14 |
| 9,557,741 | B1 * | 1/2017 | Elie | ...................... G06F 16/5854 |
| 9,599,477 | B1 * | 3/2017 | Aula | ........................ E05F 15/70 |
| 10,007,268 | B2 * | 6/2018 | Rexilius | ............... G05D 1/0246 |
| 2004/0104815 | A1 | 6/2004 | Suyama et al. | |

FOREIGN PATENT DOCUMENTS

| DE | 102012104665 A1 | 12/2013 |
|---|---|---|
| DE | 102012222562 A1 | 6/2014 |
| JP | 2007219738 A | 8/2007 |

OTHER PUBLICATIONS

Scenic, Renault—User Guide (2012), http://www.eae42.com/notices/RENAULT/espace-automobile-european-scenic-3-notice.pdf; translation from French of relevant part of p. 1.4.

* cited by examiner

*Primary Examiner* — James M McPherson
(74) *Attorney, Agent, or Firm* — Norton Rose Fulbright US LLP; Gerard Messina

(57) ABSTRACT

A method, apparatus, and computer program for localizing a motor vehicle including transmitting via a wireless communication network configured within a parking lot, for a predetermined motor vehicle, a request that the predetermined motor vehicle carry out a predetermined action. After transmission of the request, a check whether a motor vehicle located within the parking lot is carrying out or has carried out the predetermined action. If the result of the check is that a motor vehicle located within the parking lot is carrying out or has carried out the predetermined action, the motor vehicle is authenticated as the predetermined motor vehicle and the predetermined motor vehicle is localized at a current position of the motor vehicle.

11 Claims, 2 Drawing Sheets

METHOD AND APPARATUS FOR LOCALIZING A MOTOR VEHICLE

FIELD OF THE INVENTION

The present invention relates to a method and an apparatus for localizing a motor vehicle. The invention further relates to a parking lot and to a computer program.

BACKGROUND INFORMATION

Published German Patent Application DE 10 2012 222 562 A1 presents a system for managed parking areas, for transferring a vehicle from a starting position into a destination position.

In order to transfer the vehicle from the starting position into the destination position it is generally necessary to localize the vehicle within the managed parking area. If several vehicles happen to be located in the managed parking area, it is necessary as a rule also to ensure that the correct vehicle is taken from the starting position to the destination position.

SUMMARY

An object on which the invention is based is that of furnishing an efficient concept for localizing a motor vehicle.

According to one aspect a method for localizing a motor vehicle is furnished, encompassing the following steps:
- transmitting via a wireless communication network configured within a parking lot, for a predetermined motor vehicle, a request that the predetermined motor vehicle carry out a predetermined action;
- after transmission of the request, checking whether a motor vehicle located within the parking lot is carrying out or has carried out the predetermined action;
- if the result of the check is that a motor vehicle located within the parking lot is carrying out or has carried out the predetermined action, authenticating the motor vehicle as the predetermined motor vehicle and localizing the predetermined motor vehicle at a current position of the motor vehicle.

According to a further aspect an apparatus for localizing a motor vehicle is furnished, encompassing:
- a communication interface for transmitting via a wireless communication network configured within a parking lot, for a predetermined motor vehicle, a request that the predetermined motor vehicle carry out a predetermined action;
- a checking device for checking, after transmission of the request, whether a motor vehicle located within the parking lot is carrying out or has carried out the predetermined action;
- an authentication device for authenticating the motor vehicle as the predetermined motor vehicle that is carrying out or has carried out the predetermined action; and
- a localization device for localizing the predetermined motor vehicle at a current position of the motor vehicle.

According to yet another aspect a parking lot, encompassing the apparatus for localizing a motor vehicle, is furnished.

According to a further aspect a computer program is furnished, which program encompasses program code for carrying out the method for localizing a motor vehicle when the computer program is executed on a computer.

The invention thus encompasses, in particular and inter alia, the idea that a motor vehicle can be efficiently localized if a predetermined motor vehicle is instructed to carry out a predetermined action, a check then being made as to whether a motor vehicle that is carrying out or has carried out the predetermined action is located within the parking lot, so that the motor vehicle that is carrying out or has carried out the predetermined action is thereby determined as the motor vehicle for which the request was conceived or meant. The current position of the motor vehicle that has carried out or is carrying out the predetermined action thus corresponds to the position of the predetermined motor vehicle, so that efficient localization of the predetermined motor vehicle is thereby made possible.

In other words, the idea of the present invention is based in particular on requesting that the predetermined vehicle carry out a predetermined action, on the basis of which the predetermined motor vehicle can be localized and identified.

This advantageously makes it possible in particular, even when several motor vehicles are located within the parking lot, to efficiently and reliably identify the predetermined motor vehicle from among the several motor vehicles. This is because motor vehicles for which the request is not meant may receive that request via the wireless communication network, but those motor vehicles do not carry out the predetermined action. Only the motor vehicle that corresponds to the predetermined motor vehicle will carry out the predetermined action in response to reception of the request via the wireless communication network. Motor vehicles that do not carry out the predetermined action therefore cannot correspond to the predetermined motor vehicle.

According to an embodiment the request encompasses, for example, an identifier identifying the predetermined motor vehicle. Motor vehicles that receive such a request via the wireless communication network can therefore know that that request is meant not for them but instead for a different motor vehicle, namely the predetermined motor vehicle.

An identifier encompasses, for example, a license plate of the motor vehicle and/or a chassis number of the motor vehicle and/or a name of an owner of the motor vehicle. The identifier is stored, for example, in an internal memory of the motor vehicle.

According to an embodiment, the wireless communication network encompasses a WLAN communication network and/or a mobile radio communication network.

In an embodiment, the communication network encompasses a communication network in accordance with the LoRa standard. "LoRa" stands for "low power wide range communication." In am embodiment, the wireless communication network therefore encompasses a LoRa communication network.

In an embodiment, a communication via the wireless communication network respectively becomes or is encrypted.

A "parking lot" for purposes of the present invention can also be referred to as a "parking area" and serves as a parking surface for vehicles. The parking area constitutes a continuous area that encompasses several parking locations (in the context of a parking lot on private property) or parking spaces (in the context of a parking lot on public property). In the interest of simplicity, the parking locations and parking spaces are respectively referred to as "parking positions." According to an embodiment, the parking lot is configured as a parking structure or parking garage.

In a further embodiment, provision is made that after transmission, the parking lot is monitored by way of one or several surroundings sensors in order to ascertain surroundings data corresponding to the monitoring, the check being carried out based on the ascertained surroundings data.

This brings about in particular the technical advantage that checking can be carried out efficiently. Carrying out the check "based on the ascertained surroundings data" means in particular that the surroundings data are analyzed as to whether a motor vehicle that is carrying out the predetermined action is located in the region or regions monitored by way of the one or several surroundings sensors.

A surroundings sensor is, for example, a video sensor, so that the corresponding surroundings data correspond to video data. According to this embodiment the check thus encompasses an image analysis of the video data in order to check whether a motor vehicle that is carrying out the predetermined action is located in the region monitored by way of the video sensor.

According to an embodiment, the one or several surroundings sensors are respectively configured as one of the following surroundings sensors: radar sensor, video sensor, laser sensor, lidar sensor, ultrasonic sensor, infrared sensor, and magnetic sensor. The several surroundings sensors are configured identically or differently.

In a further embodiment, provision is made that the predetermined action is an action selected from the following group of actions: activation of one or more elements of a vehicle illumination system, in particular a headlight and/or a fog light and/or a brake light of the vehicle illumination system, and/or a directional indicator; activation of a wiper, in particular a wiper of a headlight; activation of a horn; opening of a motor vehicle door; opening of a motor vehicle window; starting of a drive engine of the motor vehicle, with optional accelerator actuation with the drive train disengaged. "Optional" means that according an embodiment, the accelerator actuation with the drive train disengaged is not provided for. In other words, according to an embodiment provision is made only to start a drive engine of the motor vehicle. "Accelerator actuation with the drive train disengaged" encompasses, for example, the fact that a predetermined minimum engine speed is to be established.

Activation of one or more elements of the vehicle illumination system has, in particular, the technical advantage that an activated element or elements of the vehicle illumination system can be detected simply and efficiently. The check can correspondingly be carried out particularly efficiently.

Activation of the wiper has, in particular, the technical advantage that a moving wiper can be detected particularly easily by way of a surroundings sensor. This is because a wiper is a moving object that can be detected or recognized easily and efficiently, for example, in video data.

Activation of the horn has, in particular, the technical advantage that this action can be recognized or detected particularly easily, especially when the parking lot is being monitored by way of one or more microphones in order to ascertain acoustic data corresponding to the monitoring; according to an embodiment, provision is also so made.

Starting of the drive engine of the motor vehicle, with optional accelerator actuation with the drive train disengaged, has, in particular, the technical advantage that this is also an action that can be detected particularly efficiently, in particular by way of a microphone; according to an embodiment, provision is also so made. In particular when the motor vehicle actuates the accelerator with the drive train disengaged, this results in an elevated sound level relative to the case in which the motor vehicle is merely idling the drive engine, so that the predetermined motor vehicle can thereby efficiently be distinguished from other motor vehicles that are traveling at only a low vehicle speed within the parking lot.

According to a further embodiment, provision is made that the request encompasses the fact that the action is to be repeated one or more times by the predetermined motor vehicle.

This brings about in particular the technical advantage that the check can be carried out particularly efficiently because, for example, the surroundings data can be scanned for repeating signals or patterns, so that upon recognition of repeating signals it is possible to infer a motor vehicle that is repeating or has repeated the predetermined action one or more times. Provision is thus made, for example, that the surroundings data are scanned for repeating signals and/or repeating patterns.

This brings about, in particular, the technical advantage that a motor vehicle can thereby be distinguished from other motor vehicles that activate a motor vehicle illumination system only once, but do not switch it on and off again.

According to an embodiment, provision is made that the apparatus for localizing a motor vehicle is embodied or configured to execute or carry out the method for localizing a motor vehicle.

According to an embodiment, the method for localizing a motor vehicle is carried out by way of the apparatus for localizing a motor vehicle.

Technical functionalities of the apparatus are apparent from corresponding technical functionalities of the method, and vice versa.

DETAILED DESCRIPTION

Figure 1:
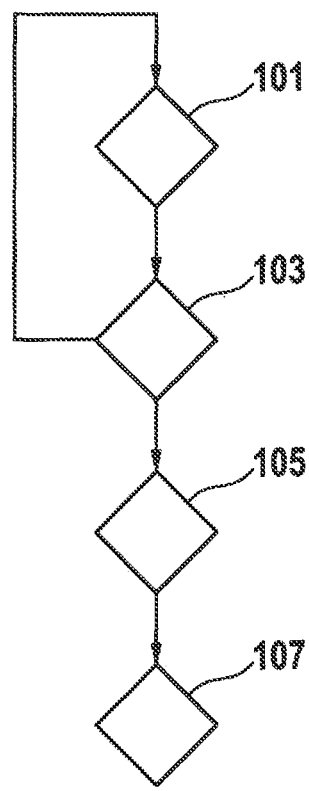
FIG. 1 is a flow chart of a method for localizing a motor vehicle.

FIG. 1 is a flow chart of a method for localizing a motor vehicle.

The method encompasses the following steps:

transmitting 101 via a wireless communication network configured within a parking lot, for a predetermined motor vehicle, a request that the predetermined motor vehicle carry out a predetermined action;

after transmission of the request, checking 103 whether a motor vehicle located within the parking lot is carrying out or has carried out the predetermined action;

if the result of the check is that a motor vehicle located within the parking lot is carrying out or has carried out the predetermined action, authenticating 105 the motor vehicle as the predetermined motor vehicle and localizing 107 the predetermined motor vehicle at a current position of the motor vehicle.

According to an embodiment, localization encompasses localization of the predetermined motor vehicle within a digital map of the parking lot.

If it is found in step 103 that no vehicle that is carrying out or has carried out the predetermined action is located within the parking lot, according to an embodiment provision is then made that the method is restarted at step 101. It is thereby possible to bring about the technical advantage, for example, that any circumstances that made it impossible to authenticate and localize the motor vehicle at the first pass, even through the predetermined motor vehicle is located within the parking lot, do not occur again at the second pass, so that this time the motor vehicle can be localized within the parking lot and authenticated.

In an embodiment that is not depicted, the method is not restarted after step 103 if the result of the check was that no motor vehicle that is located within the parking lot is carrying out or has carried out the predetermined action.

According to an embodiment, provision is made that after transmission in accordance with step 101, the parking lot is monitored by way of one or more surroundings sensors in order to ascertain surroundings data corresponding to the monitoring, the check in accordance with step 103 being carried out based on the ascertained surroundings data.

Provision is made, for example, that the surroundings sensor or the several surrounding sensors monitor one or more sub-regions of the parking lot. A sub-region of this kind is, for example, an entrance to the parking lot or an exit from the parking lot. A sub-region of this kind encompasses in particular a dropoff position at which a motor vehicle is intended to be parked for execution of an automatic parking procedure.

An automatic parking procedure can also be referred to as "automated valet parking" or "AVP."

Execution of an automatic parking procedure of this kind encompasses in particular automatic guidance of the motor vehicle from the dropoff position to a parking position of the parking lot. This occurs in driverless fashion, i.e. with no need for a driver to be in the motor vehicle. The motor vehicle is thus guided in driverless fashion. Driverless guidance encompasses, for example, remote control of the motor vehicle or autonomous driving of the motor vehicle.

An automatic parking procedure encompasses, in particular, automatic guidance of the motor vehicle from a parking position to a pickup position. This occurs, analogously to automatic guidance from the dropoff position, without a driver, i.e. in driverless fashion. This is accomplished in particular by the fact that the motor vehicle is remotely controlled or drives autonomously.

According to an embodiment, the predetermined motor vehicle is thus an AVP motor vehicle. "AVP motor vehicle" refers to a motor vehicle that is configured to carry out an automatic parking procedure. An AVP motor vehicle is thus, in particular, a motor vehicle that is configured to be remotely controlled and/or to drive autonomously.

Figure 2:
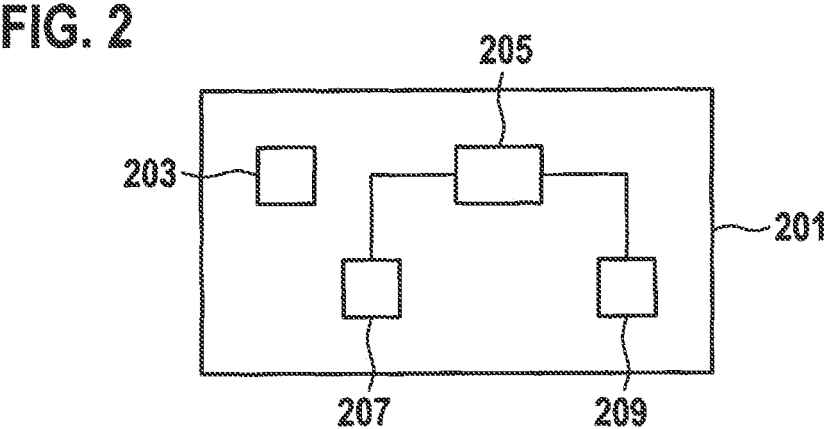
FIG. 2 shows an apparatus for localizing a motor vehicle.

FIG. 2 shows an apparatus 201 for localizing a motor vehicle.

Apparatus 201 encompasses:
  a communication interface 203 for transmitting via a wireless communication network configured within a parking lot, for a predetermined motor vehicle, a request that the predetermined motor vehicle carry out a predetermined action;
  a checking device 205 for checking, after transmission of the request, whether a motor vehicle located within the parking lot is carrying out or has carried out the predetermined action;
  an authentication device 207 for authenticating the motor vehicle as the predetermined motor vehicle that is carrying out or has carried out the predetermined action; and
  a localization device 209 for localizing the predetermined motor vehicle at a current position of the motor vehicle.

According to an embodiment, apparatus 201 encompasses one or more surroundings sensors for monitoring a parking lot.

According to an embodiment, communication interface 203 is configured to receive surroundings data from one or more surroundings sensors, for example via the wireless communication network, additionally or instead also via a wire-based communication network. According to an embodiment, communication interface 203 is thus configured to communicate via a wireless communication network and/or via a wire-based communication network.

Figure 3:
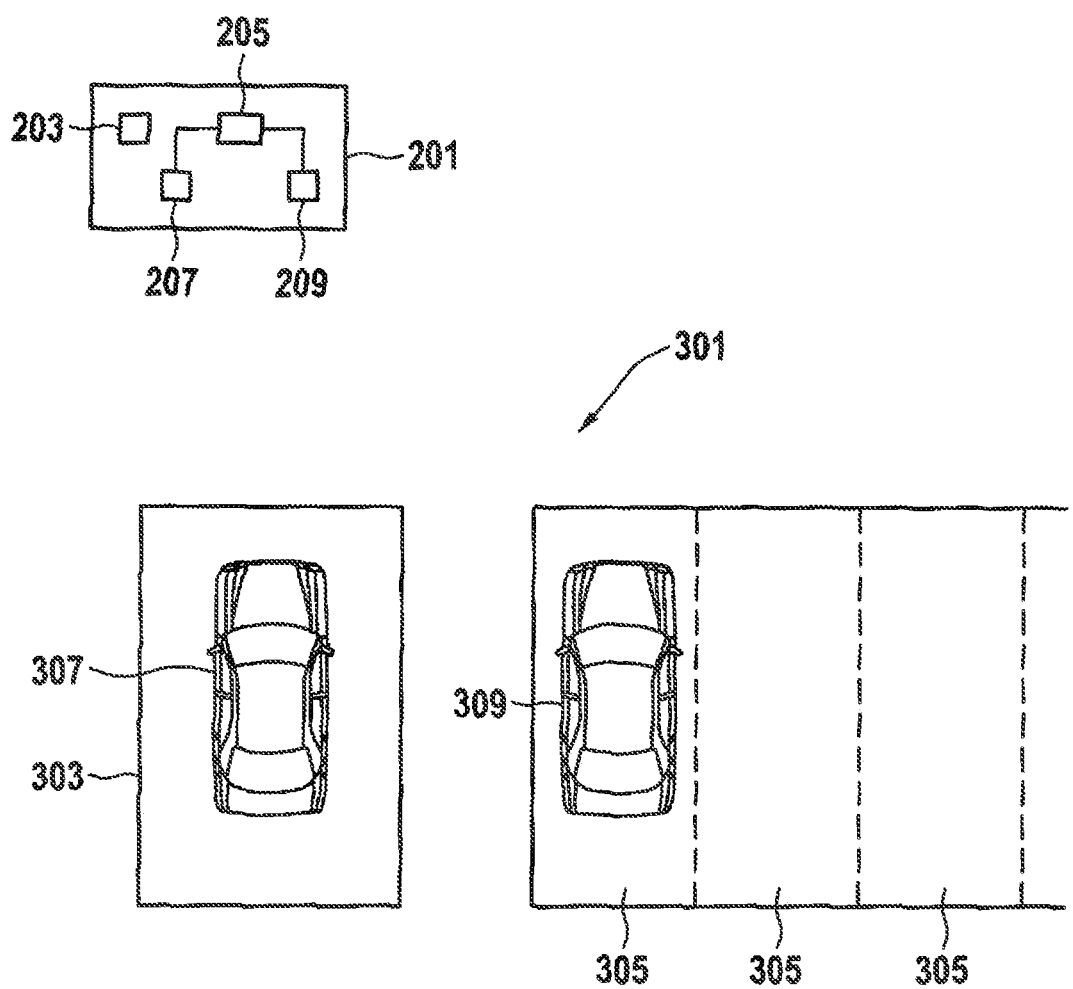
FIG. 3 shows a parking lot for motor vehicles.

FIG. 3 shows a parking lot 301 for motor vehicles.

Parking lot 301 encompasses apparatus 201 of FIG. 2.

Parking lot 301 further encompasses a dropoff position 303 at which a motor vehicle is to be parked in order to carry out an automatic parking procedure. In other words, the automatic parking procedure is intended to start at dropoff position 303.

Parking lot 301 furthermore encompasses several parking positions 305 at each of which motor vehicles can park. An automatic parking procedure encompasses automatically guiding a motor vehicle from dropoff position 303 to one of parking positions 305 and parking it there.

A motor vehicle 307 is parked at dropoff position 303. Said vehicle is not, however, meant for execution of an AVP procedure.

A motor vehicle 309 is parked in one of parking areas 305. Said vehicle is meant for execution of an automatic parking procedure. Motor vehicle 309 is not intended, however, to park at the parking position in which motor vehicle 309 is currently parked. But because dropoff position 303 is blocked by motor vehicle 307, a driver of motor vehicle 309 has parked it at parking position 305.

In the context of the automatic parking procedure, it must be assumed as a rule that the motor vehicle that is to carry out the AVP procedure is located at dropoff position 303, i.e. is parked at or in dropoff position 303. This is because the trajectories that the AVP motor vehicle is intended to travel are usually calculated in such a way that they begin at dropoff position 303.

An accident risk for a motor vehicle that is not located at dropoff position 303, but is guided as if it were starting at dropoff position 303, is thus appreciably increased compared with the case in which the AVP motor vehicle starts correctly from dropoff position 303.

A need therefore exists to localize AVP motor vehicle 309 within parking lot 301, since it is then possible as applicable, as a function of the localization, to recalculate a trajectory that motor vehicle 309 is travel. In particular, for example, a new parking position can then be selected for motor vehicle 309.

Provision is therefore made according to the present invention to transmit, via a wireless communication network configured within parking lot 301, a request that is meant for motor vehicle 309. The request encompasses the fact that motor vehicle 309 is to carry out a predetermined action.

This request can also be received, for example, by motor vehicle 307. But because this request is not meant for motor vehicle 307, the latter will not carry out that predetermined action.

Motor vehicle 309, on the other hand, knows upon reception of the request that it is meant for motor vehicle 309. Motor vehicle 309 will thus carry out the predetermined action in response to reception of the request.

Parking lot 301 is monitored by way of a surroundings sensor suite encompassing one or more surroundings sensors, so that based on the monitoring it is possible to identify whether one of the motor vehicles that is located within parking lot 301 is carrying out or has carried out the predetermined action. Motor vehicle 309 can thus be distinguished as that motor vehicle, of the two motor vehicles 307, 309, which is intended to carry out the AVP procedure.

It is thereby correspondingly possible to determine that motor vehicle 309 is not currently located at dropoff position 303. The AVP procedure will then, for example, be correspondingly adapted in accordance with the current position of motor vehicle 309 at parking position 305.

The predetermined action encompasses, for example, illumination of a headlight. This means that motor vehicle 309 is requested to operate a headlight in such a way that the latter lights up. This action in particular can very easily be identified by way of one or more cameras of a parking lot monitoring infrastructure. In other words, a check is made as to whether the headlight belongs to the motor vehicle that a parking lot management system presumes is the AVP motor vehicle.

In a further embodiment, the predetermined action is an illumination of a blinker (activation of a directional indicator).

In a further embodiment, provision is made that the predetermined action is activation of a brake light. This brings about in particular the technical advantage that this action can be detected even if the motor vehicle's rear end is facing toward a surroundings sensor, for example a camera.

In a further embodiment, provision is made for communication of several predetermined actions. Such a communication encompasses, for example, activation of a directional indicator, activation of a headlight, and activation of a brake light.

In an embodiment, the request encompasses repetition of the predetermined action one or more times by the predetermined motor vehicle. In other words, the action can be made up, for example, of a sequence. One such sequence is, for example, a repeated switching on and off of one or more elements of a vehicle illumination system and/or of a brake light and/or of a directional indicator and/or of a wiper and/or of a horn, and/or repeated opening and closing of a motor vehicle door and/or repeated opening and closing of a motor vehicle window and/or repeated starting and switching off of a drive engine of the motor vehicle, with optional accelerator actuation with the drive train decoupled.

One substantial advantage is that redundant and robust localization and authentication of the motor vehicle can be achieved by way of the concept according to the present invention.

What is claimed is:

1. A method for localizing a motor vehicle, comprising:
    transmitting via a wireless communication network configured within a parking lot, for a predetermined motor vehicle, a request that the predetermined motor vehicle carry out a predetermined action;
    based on the transmission of the request, checking whether a motor vehicle located within the parking lot is carrying out or has carried out the predetermined action, and monitoring the parking lot via at least one surroundings sensor situated external to the motor vehicle in order to ascertain surroundings data corresponding to the monitoring, the checking being carried out based on the ascertained surroundings data;
    based on the checking, authenticating the motor vehicle as the predetermined motor vehicle and localizing the predetermined motor vehicle at a current position of the motor vehicle.

2. The method as recited in claim 1, wherein the predetermined action is an action corresponding to one of:
    an activation of at least one element of a vehicle illumination system,
    an activation of a wiper, in particular a wiper of a headlight,
    an activation of a horn,
    an opening of a motor vehicle door,
    an opening of a motor vehicle window, and
    a starting of a drive engine of the motor vehicle, with an optional accelerator actuation with a drive train disengaged.

3. The method as recited in claim 2, wherein:
    the at least one element of the vehicle illumination system includes at least one of a headlight, a fog light, a brake light, and a directional indicator, and
    the wiper is a wiper of a headlight.

4. The method as recited in claim 1, wherein the request includes a request that the predetermined action is to be repeated at least one time by the predetermined motor vehicle.

5. An apparatus for localizing a motor vehicle, comprising:
    a communication interface for transmitting via a wireless communication network configured within a parking lot, for a predetermined motor vehicle, a request that the predetermined motor vehicle carry out a predetermined action;
    a checking device configured for checking, after transmission of the request, whether a motor vehicle located within the parking lot is carrying out or has carried out the predetermined action;
    an authentication device configured for authenticating the motor vehicle as the predetermined motor vehicle that is carrying out or has carried out the predetermined action; and
    a localization device configured for localizing the predetermined motor vehicle at a current position of the motor vehicle.

6. The apparatus as recited in claim 5, the checking device configured for carrying out the checking based on surroundings data that correspond to a monitoring of the parking lot carried out via at least one surroundings sensor.

7. The apparatus as recited in claim 5, wherein the predetermined action is an action corresponding to one of:
    an activation of at least one element of a vehicle illumination system,
    an activation of a wiper, in particular a wiper of a headlight,
    an activation of a horn,
    an opening of a motor vehicle door,
    an opening of a motor vehicle window, and
    a starting of a drive engine of the motor vehicle, with an optional accelerator actuation with a drive train disengaged.

8. The apparatus as recited in claim 7, wherein:
    the element of the vehicle illumination system includes at least one of a headlight, a fog light, a brake light, and a directional indicator, and
    the wiper is a wiper of a headlight.

9. The apparatus as recited in claim 5, wherein the request includes a request that the predetermined action is to be repeated at least one time by the predetermined motor vehicle.

10. A parking lot, comprising:
    an apparatus for localizing a motor vehicle, the apparatus including:
        a communication interface for transmitting via a wireless communication network configured within a parking lot, for a predetermined motor vehicle, a request that the predetermined motor vehicle carry out a predetermined action;
a checking device configured for checking, after transmission of the request, whether a motor vehicle located within the parking lot is carrying out or has carried out the predetermined action;
an authentication device configured for authenticating the motor vehicle as the predetermined motor vehicle that is carrying out or has carried out the predetermined action; and
a localization device configured for localizing the predetermined motor vehicle at a current position of the motor vehicle.

11. A computer program stored on a non-transitory computer-readable storage device includes program code for carrying out, when the computer program is executed on a computer, a method for localizing a motor vehicle, the method comprising:

transmitting via a wireless communication network configured within a parking lot, for a predetermined motor vehicle, a request that the predetermined motor vehicle carry out a predetermined action;

based on the transmission of the request, checking whether a motor vehicle located within the parking lot is carrying out or has carried out the predetermined action, and monitoring the parking lot via at least one surroundings sensor situated external to the motor vehicle in order to ascertain surroundings data corresponding to the monitoring, the checking being carried out based on the ascertained surroundings data;

based on the checking, authenticating the motor vehicle as the predetermined motor vehicle and localizing the predetermined motor vehicle at a current position of the motor vehicle.

* * * * *